United States Patent [19]

Warren et al.

[11] 4,319,506

[45] Mar. 16, 1982

[54] APPARATUS FOR THE PRECISION CUTTING OF HOLLOW FIBERS

[75] Inventors: Richard J. Warren, Franklin; Friedhelm Bilewski, Medway, both of Mass.

[73] Assignee: Albany International Corp., Albany, N.Y.

[21] Appl. No.: 154,829

[22] Filed: May 30, 1980

[51] Int. Cl.³ .......................... B23D 25/12; B26D 1/56

[52] U.S. Cl. .......................... 83/347; 83/561

[58] Field of Search .................. 83/561, 347, 913, 54, 83/335

[56] References Cited

U.S. PATENT DOCUMENTS

| | | | |
|---|---|---|---|
| 1,053,912 | 2/1913 | Hamilton | 83/335 X |
| 1,917,976 | 7/1933 | Johnson | 83/335 X |
| 3,731,575 | 5/1973 | Gelin | 83/561 X |
| 3,832,926 | 9/1974 | Leaseburge | 83/561 |
| 4,240,312 | 12/1980 | Ward | 83/561 X |

*Primary Examiner*—James M. Meister
*Attorney, Agent, or Firm*—Kane, Dalsimer, Kane, Sullivan and Kurucz

[57] ABSTRACT

Apparatus for severing continuous lengths of hollow fibers into predetermined, equal lengths for use as chemical vapor dispensers is provided.

2 Claims, 6 Drawing Figures

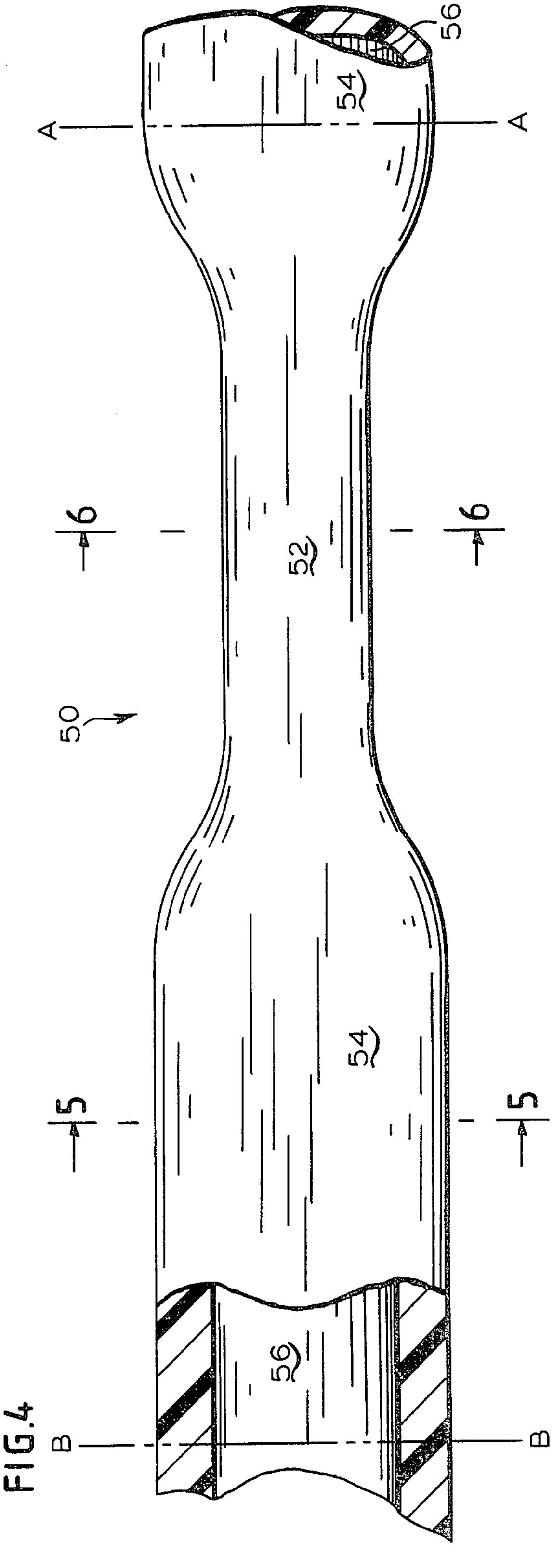
FIG.4
FIG.6
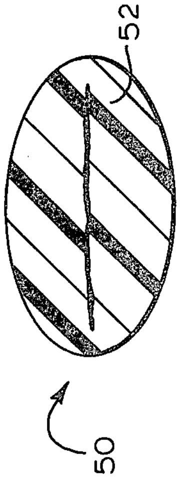
FIG.5
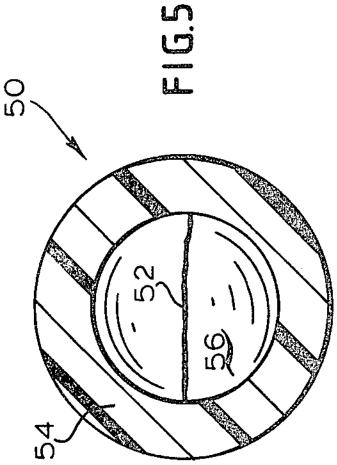

APPARATUS FOR THE PRECISION CUTTING OF HOLLOW FIBERS

BACKGROUND OF THE INVENTION

1. Field of the Invention

The invention relates to apparatus for severing continuous lengths of hollow fibers and more particularly relates to apparatus for the precision cutting of continuous lengths of chemical filled hollow fibers into predetermined, equal lengths for use as chemical vapor dispensers.

2. Brief Description of the Prior Art

Hollow fibers have been employed as vapor dispensers for the controlled release of certain chemical compounds. When the hollow fibers are filled with certain chemicals, they will provide for a sustained, controlled release of the chemical into the environment through their open ends. For example, the vapor dispensers have been very effective when used with synthetic sex attractants (pheromones) to control the cotton ravaging pink bollworm indigenous to the desert southwest. When evenly dispersed in the fields, the tiny hollow fibers release a few micrograms per day of the pheromone into the air. The compound is so potent that male moths become confused and are incapable of locating the females for mating, except for a few chance encounters. Without fertilization, the female moth lays infertile eggs and dies, leaving no offspring. The result of this biological "confusion technique" is a dramatic reduction in the number of cotton bolls infester with larvae.

The continuous lengths of the hollow fibers are filled with the pheromone and sealed at the ends and at regular intervals along their length. The continuous lengths are then cut either adjacent to the zones of the sealed portions along the regular intervals of the hollow fibers or in the center between seal to produce short, pheromone filled pieces open at one or both ends thereof. The cut provides an open end and allows the pheromone to escape slowly and evaporate into the air. The length of the fiber determines the duration of the application. One will appreciate that it is desirable to cut predetermined lengths of pheromone filled hollow fibers from the continuous lengths, with a high degree of accuracy and uniformity.

The apparatus of the present invention provides a means of cutting chemical filled hollow fibers with a high degree of precision to obtain uniform cuttings of the filled hollow fibers which may be used as vapor dispensers of the chemical contained by the hollow fibers.

SUMMARY OF THE INVENTION

The invention comprises apparatus for the precision cutting of a continuous strip of a hollow fiber into predetermined lengths, which comprises;

- an endless surface for the support of the strips during cutting;
- means for rotating the surface while supporting the strip;
- a plurality of cutting blades mounted about the periphery of a roller means and spaced apart from each other a distance equal to the desired predetermined lengths of the hollow fibers; and
- means for rotating said roller means in spaced relationship from the endless surface so that the blades will sever the strip of hollow fibers passing between the blades and the endless surface.

BRIEF DESCRIPTION OF THE DRAWINGS

FIG. 4 is an enlarged view of a hollow fiber, partly sectioned, which may be precision cut by the apparatus of the invention.

FIG. 5 is a view along lines 5—5 of FIG. 4.

FIG. 6 is a view along lines 6—6 of FIG. 4.

DETAILED DESCRIPTION OF THE PREFERRED EMBODIMENTS OF THE INVENTION

A complete understanding of the invention may be gleaned from the following description when read in conjunction with the accompanying drawings of FIGS. 1-6, inclusive.

Figure 1:
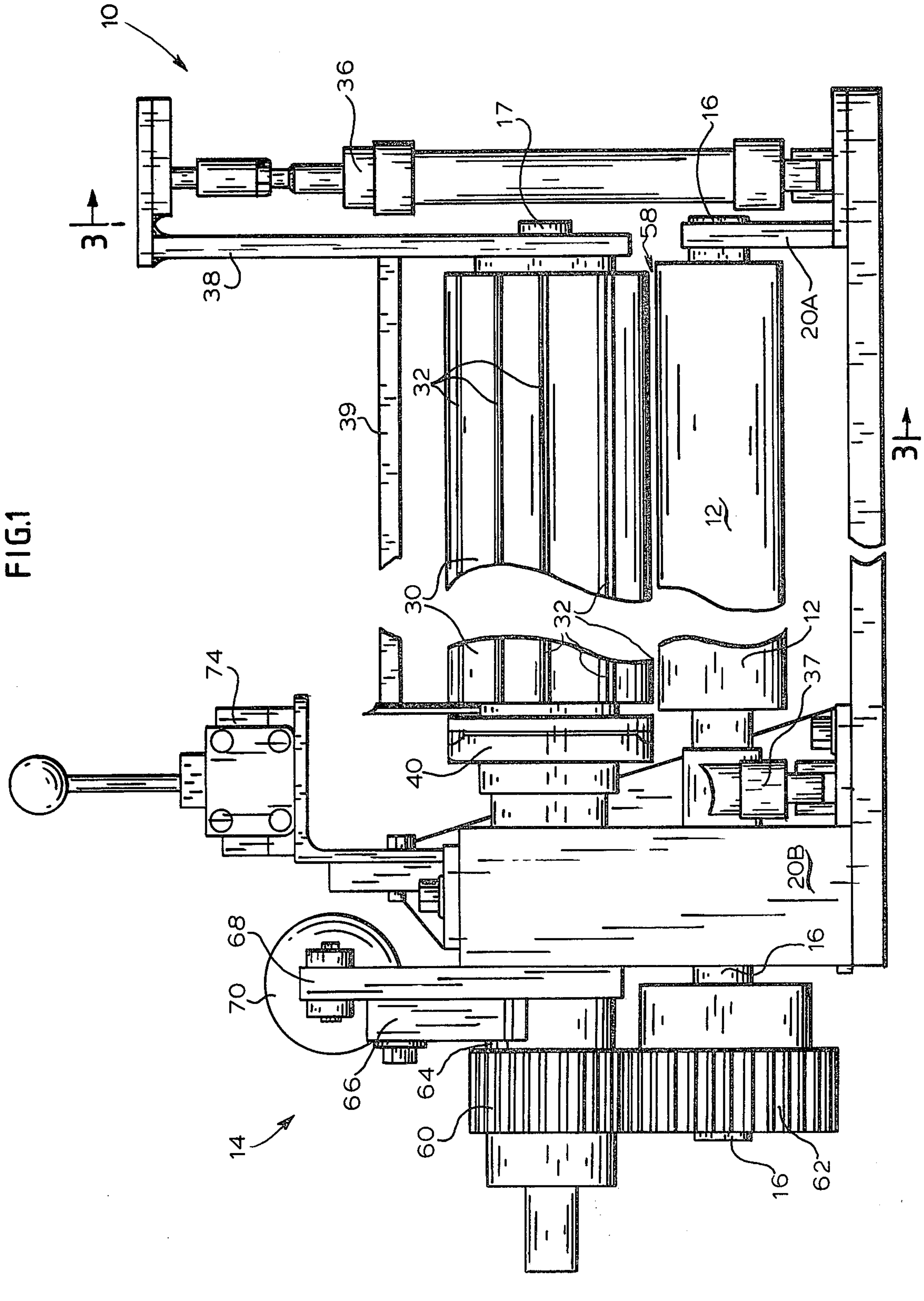
FIG. 1 is an end view of a preferred embodiment apparatus of the invention.

Referring first to FIG. 1, there is seen a front view of a preferred embodiment apparatus 10 of the invention. The apparatus 10 comprises a roller 12 mounted on a shaft 16 and powered for counter clockwise rotation by drive means 14. The surface of roller 12 is in effect an endless surface for the support of strip 18 which is a single strip of a chemical filled hollow fiber (see FIG. 3). The roller 12 functions to support the strip 18 during its severance into a plurality of pieces as will be described more fully hereinafter. The shaft 16 is supported on support legs 20A and 20B and is rotationally driven by the drive means 14. Mounted directly above roller 12 is another roller 30 which bears on its surface a plurality of spaced apart cutting blades 32. The cutting blades 32 are positioned apart from each other a distance equal to the desired lengths predetermined to be cut from strip 18. The roller 30 is mounted on shaft 17 a distance above roller 12 on pneumatic piston means 36 and 37 through shaft supports 38 and 39 so that the blades 32 will sever strips 18 as they pass between the rollers 12, 30. Piston means 37 has been partially cut away in FIG. 1; see FIG. 2. The piston means 36,37 pressures the roller 30 against strip 18 as it passes between the rollers 12, 30 and into nip 58. Strip 18, passing through the nip 58 between roller 30 and support roller 12 is thus held in association with the supporting surface of roller 12 so that frictional traction is applied to pull the strip 18 on the surface of roller 12 as roller 12 rotates.

The roller 30 is rotated clockwise (in a direction opposite to the rotation of roller 12) through a Schmidt coupling 40 connecting shaft 17 to the drive means 14. The Schmidt coupling 40 offers flexibility in shaft 19 displacement while maintaining undisturbed power transmission at constant or intermittent angular velocity. The coupling 40 does not add secondary forces to the drive means 14. It also will not transmit radial vibration between the drive means 14 and driven shaft 17.

In short, coupling 40 allows complete displacement of cutting roll 30 and support roll 12 for loading or unloading, without disturbing the drive mechanism of drive means 14.

The operation of the apparatus 10 is as follows.

As the strip 18 is carried over the upper surface of roller 12, driven by the drive means 14, roller 30 is lowered. With the roller 30 emplaced a spaced distance above the surface of roller 12, and moving so that the blades 32 rotate above roller 12, the rotating blades sever a strip 18 into predetermined lengths as the strip 18 passes between the rollers 12, 30. The spaced distance between blades 32 and the support surface of roller 12 is selected so that the blades 32 will sever strip 18 on the supportive surface of roller 12, but will have minimum contact of the blades 32 with the surface of roller 12. This obviates damage to roller 12 and dulling of blades 32.

Figure 2:
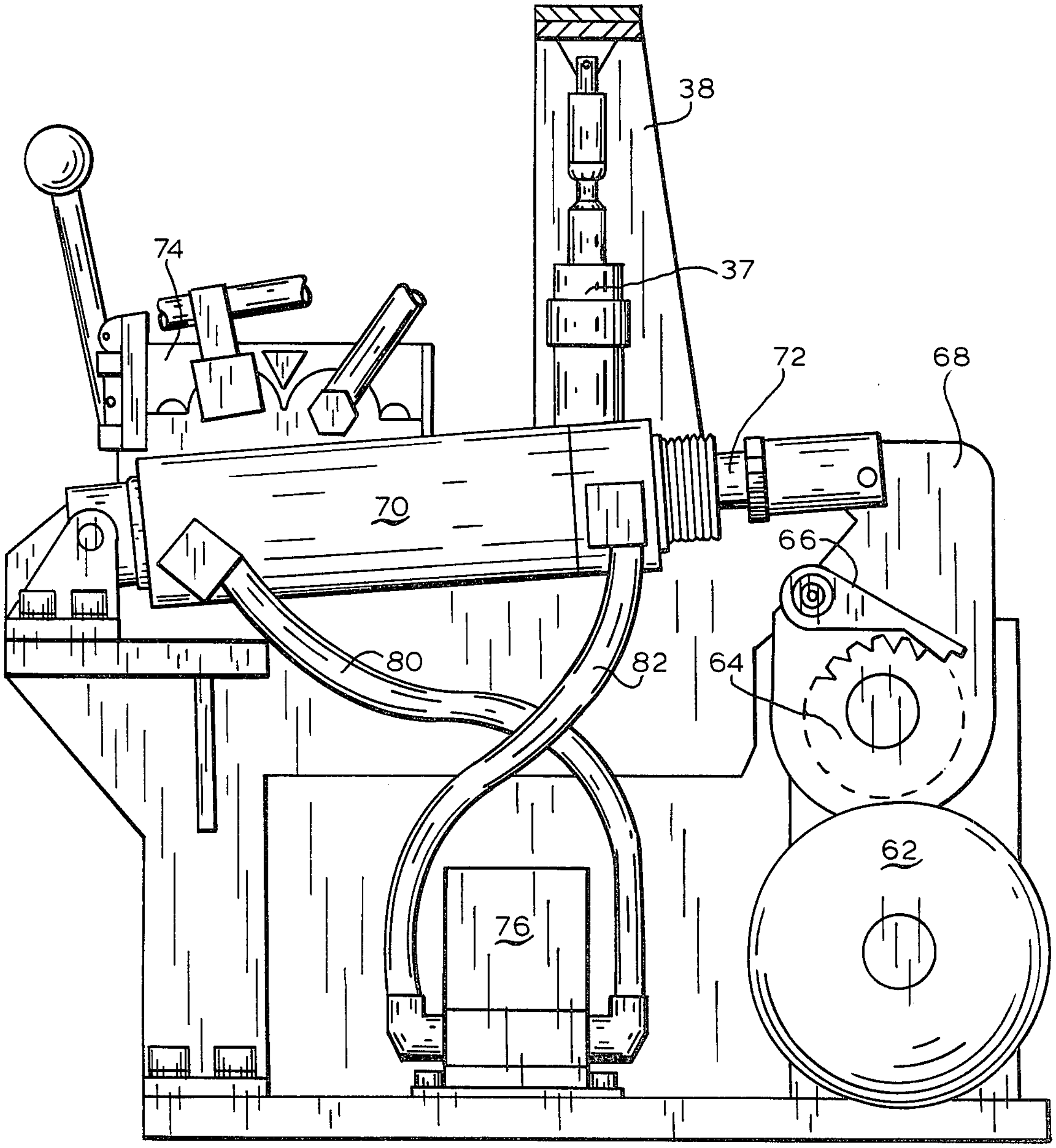
FIG. 2 is a side view of the apparatus of FIG. 1.

Referring now to FIG. 2, a side view of the apparatus 10 of FIG. 1, one may see further details of the apparatus 10 and the structure of the drive means 14. Drive means 14 comprises an upper spur gear 60 (FIG. 1) mounted on a shaft connected to the Schmidt coupling 40 (FIG. 1) and through which the roller 30 is driven. The upper spur gear 60 (FIG. 1) is engaged with a lower spur gear 62 which is mounted on the end of shaft 16 and through which drive forces are transmitted to the roller 12. A ratchet mechanism is used to transmit intermittent motion to the interengaged spur gears 60, 62.

As seen in FIG. 2, the ratchet mechanism consists of a toothed ratchet gear 64 (number of teeth depends on the number of blades in the cutting roll), and a pawl or detent 66. The pawl is pivoted to a lever or pawl plate 68, which when given an oscillating movement, imparts an intermittent rotary movement to the ratchet gear 64.

The ratchet gear 64 is fastened to the spur gear 60 (FIG. 1) and both are keyed to a drive shaft and coupled to the cutting roll 30 (FIG. 1) by the Schmidt coupling 40 (FIG. 1).

As the ratchet gear 64 is rotated, power is transmitted from the attached spur gear 60 (FIG. 1) to mating spur gear 62 (FIGS. 1 & 2) thereby rotating the bottom roll 12 simultaneously with the cutting roll 30.

The above-described gearing is also designed such that as the rolls 12, 30 rotate, the arc length travel of the cutting roll 30, for each cut, is slightly less than that of the bottom roll 12. By slightly offsetting the cutting point on the roll 12 the life of the roll 12 is increased dramatically.

The pawl plate 68 receives its oscillating movement from an air cylinder 70 which will extend and retract shaft 72 upon operation of hand control valve 74. The cylinder 70 functions by switching fluid direction with control valve 74 operating solenoid 76, through the fluid inlet 80 and out through outlet 82.

Figure 3:
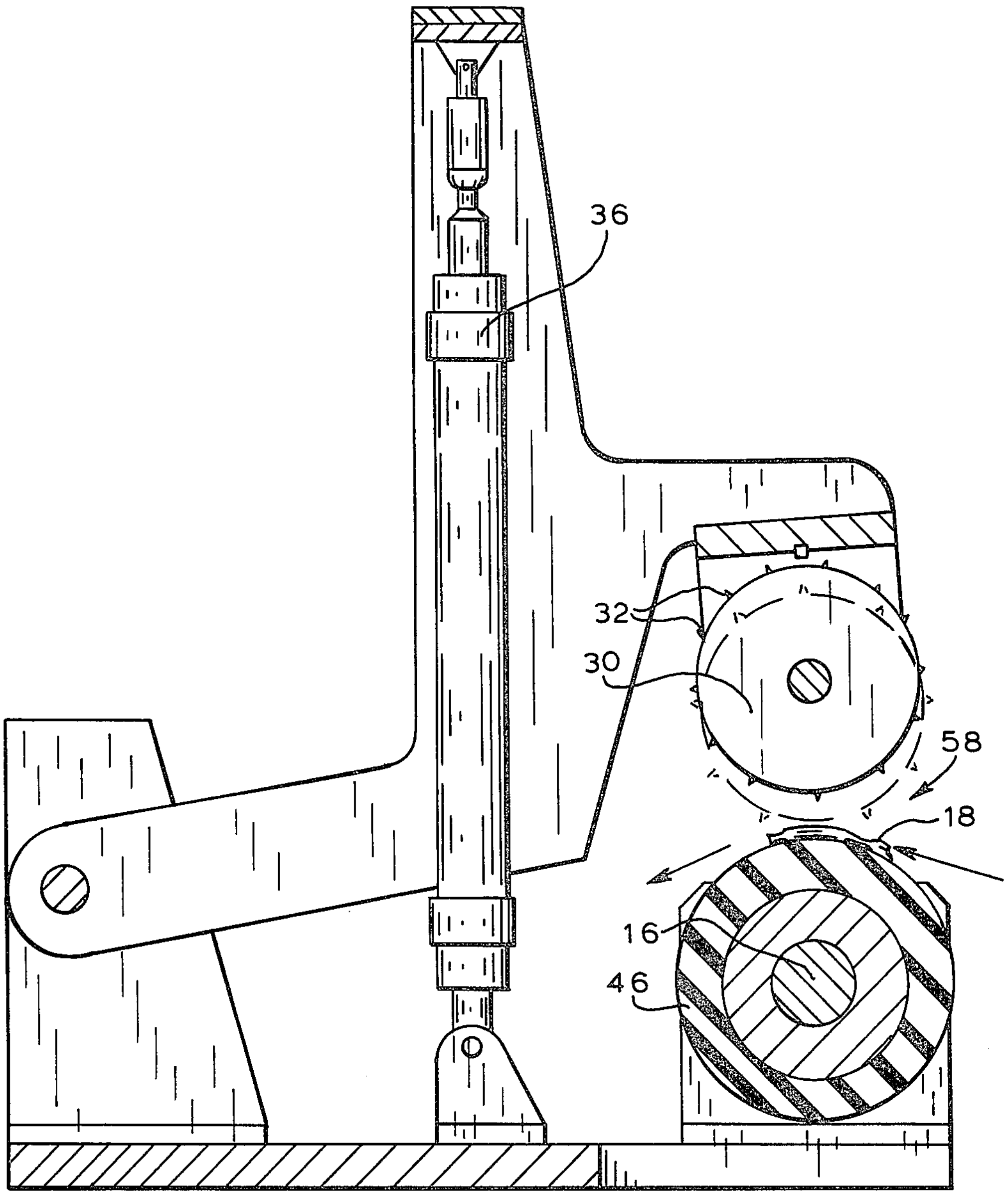
FIG. 3 is a view along lines 3—3 of FIG. 1.

FIG. 3 is a view along lines 3—3 of FIG. 1 with the roller 30 elevated. It may be lowered as shown with phantom lines so that the rotating blades 32 can make contact with strip 18 and sever them into predetermined lengths. The roller 30 is dropped into association with roller 12 to form a nip 58 for tracting the strip 18 in the direction of the arrows over the endless surface of roller 12. It will be appreciated that initial positioning of strip 18 on roller 12 will determine where the first and subsequent cutting sites will be on the body of the continuous strip 18. It will be seen in FIG. 3 that the roller 12 bears an elastomeric face 46. The elastomeric face 46 is preferably employed since it provides frictional traction to the polymeric resin material which comprises strips 18 of hollow fibers. Also, the elastomeric face 46 subjects the knife edge of blade 32 to less wear. Preferably the elastomeric face 46 is a polyurethane, most preferably having a hardness of 90 durometer±2 Shore A. Prior to operation of apparatus 10, the strip 18 is fed between rollers 12, 30 and over the surface of the roller 12 as shown in FIG. 3. By initial positioning of the strip 18, cuts with blades 32 will be made along the length of strip 18 at predetermined sites corresponding to the distance between individual blades 32.

FIG. 4 is an enlarged view of a hollow fiber, partly sectioned, which may be precision cut by the apparatus 10 of the invention. The apparatus 10 is advantageously employed to sever chemical filled hollow fibers such as that shown in FIG. 4 wherein a portion 52 at spaced intervals has been subjected to heat and pressure (sealing) to close off the hollow 56 within the hollow fiber. This leaves the normally expanded portion 54 for containment of chemicals and seals the ends of the hollow 56 at periodic positions. The strip 18 with periodic closed portions 52 may be fed through the apparatus 10 as previously described for severance at any desired position along the hollow fiber strip 18 to provide lengths 50. Generally, it will be preferred to cut the strip 18 at points adjacent to the sealed portions 52, i.e.; along lines A—A and B—B of FIG. 4.

FIG. 5 is a view along lines 5—5 of FIG. 4 and shows the hollow 56 within expanded portion 54 of the hollow fiber.

FIG. 6 is a view along lines 6—6 of FIG. 4 and shows the sealed area 52 of the hollow fiber.

Hollow fiber strips and the method of their manufacture are well known in the art as are methods of their filling with chemical compositions; see for example U.S. Pat. Nos. 2,399,259 and 3,389,548.

It will be appreciated by those skilled in the art that although the apparatus 10 has been described above as cutting a single strip 18 of hollow fibers, a plurality of strips 18 can be passed through the nip 58 at a given time, for cutting.

It will also be appreciated by those skilled in the art that many modifications can be made to the above-described apparatus 10 without departing from the spirit and the scope of the invention. For example, the rollers 30 may be adapted for interchange with other rollers having a different spacing of blades 32 so that the predetermined spacing of cuts along the length of the strip 18 may be made at will. Also, the blades 32 may be removably mounted on the roller 30 so that they may be removed or replaced as desired. Also, the roller 30 can be powered to rotate independently of the roller 12 if so desired.

The materials employed to fabricate the apparatus of the invention may be any conventionally used in the art. In a preferred embodiment of the invention, the blades 32 are made for disposability, i.e.; they are made for a single use and when they become dull are disposed of rather than resharpened. Where solid or rotary type knives are used, a serious loss of product value commonly occurred when one or more of the hand sharpened knives became prematurely dull and damaged the hollow fiber cut ends before the knife condition became evident. When this occurred, all the knives on a machine had to be resharpened (at considerable expense). Field experience shows that a disposable blade generally chops as much or more than one resharpening of a solid or rotary type knife and at much lower cost. Substantial increases in product value result from the regular replacement of disposable blades before the hollow fiber damage due to dull cutting edges can occur.

Preferred cutting blade 32 specifications for a disposable blade are as follows:

1. Stainless steel to avoid contamination.
2. Hardened and ground for maximum blade life.
3. Thickness—0.009" with a tolerance range from 0.005" to 030".

4. Width—0.500" to avoid flexing, with a tolerance range of 0.375" to 0.625".
5. Length—10" with a tolerance range from 6"-60".
6. Bevel on blade thickness from 0.005" to 0.013" is extra sharp, double bevel with a honed edge angle of 22°. Bevel on blade thickness from 0.014" to 0.030" is a durable, double bevel with a honed edge angle of 32°.

What is claimed:

1. Apparatus for the precision cutting of a continuous strip of a hollow fiber into predetermined lengths, which comprises;

a first roller for the support of the strip during cutting, said roller having an elastomeric surface;

means for intermittently rotating the first roller while supporting the strip;

a plurality of cutting blades mounted about the periphery of a second roller and spaced apart from each other a distance equal to the desired predetermined lengths of the hollow fibers; and means for intermittently rotating said second roller in spaced relationship from the first roller so that the blades will sever the strip of hollow fibers passing between the blades and the first roller, said means for rotating comprising a ratchet mechanism.

2. Apparatus for the precision cutting of a continuous strip of a hollow fiber into predetermined lengths, which comprises;

a first roller for the support of the strip during cutting, said roller having an elastomeric surface;

means for intermittently rotating the first roller while supporting the strip;

a plurality of cutting blades mounted about the periphery of a second roller and spaced apart from each other a distance equal to the desired predetermined lengths of the hollow fibers; and means for intermittently rotating said second roller in spaced relationship from the first roller so that the blades will sever the strip of hollow fibers passing between the blades and the first roller; and wherein the first and second rollers are geared to a fixed predetermined relationship and the arc length travel of the second roller is slightly less than that of the first roller so as to prevent the blades from meeting the previous cut upon surface of the first roller.

* * * * *